even

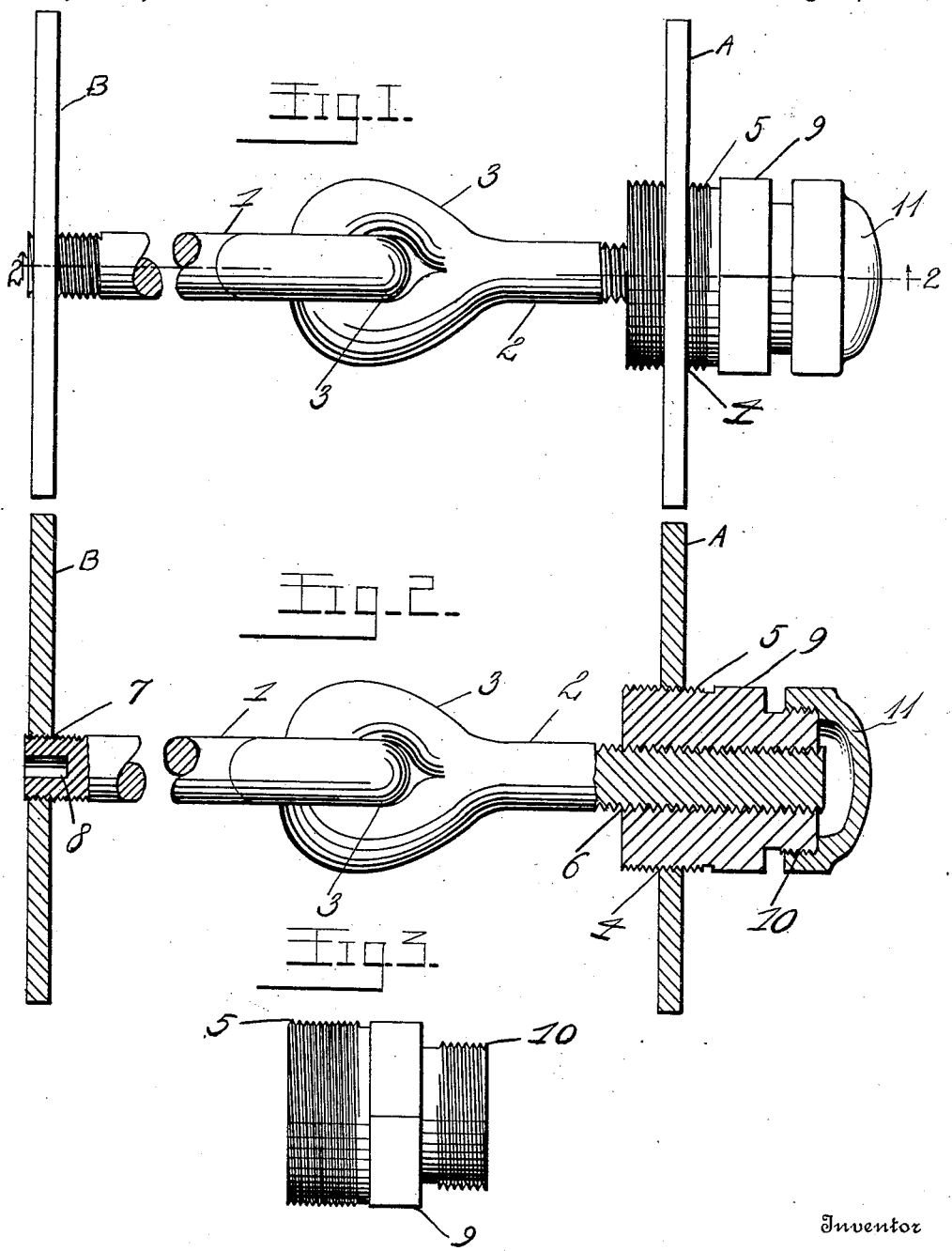

UNITED STATES PATENT OFFICE.

SYLVESTER J. WALKER, OF MEADVILLE, PENNSYLVANIA.

STAY-BOLT FOR BOILERS.

1,070,755.    Specification of Letters Patent.    Patented Aug. 19, 1913.

Application filed November 11, 1912. Serial No. 730,697.

*To all whom it may concern:*

Be it known that I, SYLVESTER J. WALKER, a citizen of the United States, residing at Meadville, in the county of Crawford and State of Pennsylvania, have invented certain new and useful Improvements in Stay-Bolts for Boilers; and I do declare the following to be a full, clear, and exact description of the invention, such as will enable others skilled in the art to which it appertains to make and use the same.

This invention relates to improvements in stay bolts especially designed for use in connection with steam boilers.

The principal object of the invention is to produce a simple and efficient device of this character constructed to provide for expansion and contraction of the boiler plates and thereby prevent breakage of the bolts.

Another object is to provide improved means for rapidly adjusting the bolts.

One of the difficulties in the use of steam boilers is the constant contraction and expansion to which the boilers are subjected when in use and as a consequence the stay bolts are subjected to a constant warping or bending strain in opposite directions. This results in breaking the bolts close to one of the sheets to which the bolts are attached.

With these and other objects in view, the invention consists of certain novel features of construction, and the combination and arrangement of parts as will be more fully described and claimed.

In the accompanying drawings; Figure 1 represents a side elevation of this improved stay bolt applied; Fig. 2 is a longitudinal section thereof; Fig. 3 is a detail side elevation of the adjusting nut or sleeve.

In the embodiment illustrated two plates A and B of a boiler are shown which must be supported at intervals by stay bolts, one of which is shown herein composed of two sections 1 and 2 which are suitably jointed to each other to provide for their movement a limited amount in all directions. Various forms of joints may be employed, the one herein shown being simple and efficient and comprises an eye 3 formed on the inner ends of each joint which eyes interlock as shown to form in effect a knuckle joint. This joint, however, prevents independent rotary movement of the two sections so that the bolt can be screwed into place by turning on one end thereof. This knuckle joint is necessarily of considerable size and as a consequence the hole in one of the sheets is shown sufficiently large to permit the entrance of the bolt, and is closed by a spud or sleeve 5. The openings for the spud 5 may however be checkered or placed in any convenient position and by the aid of tongs the bolts can be passed through and transferred to smaller holes and consequently smaller spuds may be used. As shown in the drawings the hole 4 in the outside sheet A is made quite large and is threaded to receive the adjusting sleeve 5 which is of a size to close said hole and is provided with a threaded bore 6 of considerably less diameter than the diameter of the sleeve and of a size to fit one end of the bolt section 2 which is externally threaded to engage said bore. The bore of this sleeve 5 is of uniform diameter throughout and the exteriorly threaded portion of said sleeve is also of uniform diameter throughout to provide for the bolt being adjusted to any extent. The other section 1 of the bolt is also threaded at its outer end for threaded engagement with an aperture 7 formed in the fire box plate B, said section end 1 is also provided with a socket 8 for a purpose to be described. This sleeve 5 has a head 9 of hexagonal or other suitable shape to receive a wrench or spanner to provide for the turning of the head within the opening 4. This sleeve 5 has a reduced outer end 10 also externally threaded to receive a cap 11 and form a perfectly steam tight joint at this end of the stay bolt.

The threaded periphery of the sleeve 5 which engages the aperture 4 in the outside plate of the boiler being much larger than its internal bore 6 with which the threaded end of the bolt section 2 is engaged, on the turning of said sleeve in either direction the bolt section will travel much faster than the periphery of the sleeve in the opening 4 and consequently when said sleeve is screwed inward will take up the slack in the knuckle joint of the bolt. Should the sleeve 5 after being screwed in to its extreme limit not be tight in said sheet A the other section 1 may be screwed inward by inserting a suitable tool in the socket 8 therein and screwing said section inward a sufficient distance to provide more slack in the joint of the bolt so as to permit the nut or sleeve 5 to be turned sufficiently to form a tight connection between it and the plate A. If the knuckle joint is not tight after the sheet A is tight the bolt section 1 is turned outward in the fire box sheet or plate B and the projecting end of said section is cut off and upset.

The knuckle joint shown at 3 permits the two bolt sections to move relatively to each other in all directions so that unequal expansion and contraction of the boiler plates will not produce any bending strain in the metal of the bolt and consequently the bolts will last much longer than the ordinary non-flexible bolts.

The thread on the periphery of the sleeve or nut 5 is much finer than that of its bore and the end of the bolt with which said bore is engaged whereby great power is obtained on the turning of the sleeve and the bolt drawn outward at a greater speed to suitably tension the bolt.

While I have described my invention with more or less minuteness as regards details and as being embodied in certain precise forms, I do not desire to be limited thereto unduly any more than is pointed out in the claim. On the contrary, I contemplate all proper changes in form, construction and arrangement, the omission of immaterial elements and substitution of equivalents as circumstances may suggest or render expedient.

I claim as my invention:

A stay bolt comprising two jointed sections with their outer ends threaded and of uniform diameter throughout, an adjusting sleeve the bore of which is of uniform diameter throughout and threaded to receive the outer end of one of said sections, said sleeve being exteriorly threaded and the thread thereof being finer than that of its bore the exteriorly threaded portion of said sleeve being of uniform diameter throughout.

In testimony whereof I have hereunto set my hand in presence of two subscribing witnesses.

SYLVESTER J. WALKER.

Witnesses:
  Mrs. R. H. Weller,
  Blanche S. Brush.

---

Copies of this patent may be obtained for five cents each, by addressing the "Commissioner of Patents, Washington, D. C."